United States Patent
Brown et al.

(10) Patent No.: US 10,623,596 B1
(45) Date of Patent: Apr. 14, 2020

(54) APP SYNCHRONIZED WITH LIGHTED PHYSICAL DESIGN ELEMENT ON DOCUMENT PROCESSING APPARATUS

(71) Applicant: Xerox Corporation, Norwalk, CT (US)

(72) Inventors: Donald A. Brown, Honeoye Falls, NY (US); David M. Parsons, Victor, NY (US); Marc J. Krolczyk, Spencerport, NY (US); Michael J. Telek, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/229,253

(22) Filed: Dec. 21, 2018

(51) Int. Cl.
| H04N 1/00 | (2006.01) |
| G06F 3/0481 | (2013.01) |
| G06T 11/00 | (2006.01) |
| G06F 3/0484 | (2013.01) |

(52) U.S. Cl.
CPC ....... *H04N 1/0049* (2013.01); *G06F 3/04817* (2013.01); *G06T 11/001* (2013.01); *H04N 1/00307* (2013.01); *H04N 1/00477* (2013.01); *G06F 3/0484* (2013.01); *H04N 1/00501* (2013.01)

(58) Field of Classification Search
None
See application file for complete search history.

(56) References Cited

U.S. PATENT DOCUMENTS

| 6,300,871 | B1 | 10/2001 | Irwin et al. |
| 6,667,750 | B1 | 12/2003 | Halstead, Jr. et al. |
| 6,694,249 | B1 | 2/2004 | Anderson et al. |
| 7,093,005 | B2 | 8/2006 | Patterson |
| 8,469,800 | B2 | 6/2013 | LeMay et al. |
| D721,724 | S | 1/2015 | Horst et al. |
| 9,405,456 | B2 | 8/2016 | Privault et al. |
| D820,866 | S * | 6/2018 | Lim .............................. D14/486 |
| D821,426 | S * | 6/2018 | Kim .............................. D14/486 |

(Continued)

FOREIGN PATENT DOCUMENTS

| JP | 2014036286 A * | 2/2014 |
| JP | 2016126574 A * | 7/2016 |

(Continued)

OTHER PUBLICATIONS

Fujiwara Toru, JP-2016133971-A English Translation, 2016, Abstract, par 0031, 0057, 0059, 0201 (Year: 2016) 0063, 0068-0072, 0075-0082, 0201 (Year: 2016).*

(Continued)

*Primary Examiner* — Miya J Williams
(74) *Attorney, Agent, or Firm* — Gibb & Riley, LLC

(57) ABSTRACT

A document processing apparatus has a physical design element on the exterior surface. The physical design element has lighting elements adapted to change color. An app is adapted to be supplied to an external computing device. The app causes a screen of the external computing device to display an icon matching the physical design element. The app is adapted to communicate with the document processing apparatus through the external computing device. The app is adapted to simultaneously change the appearance of the icon and the physical design element during different steps of document processing operations to keep the icon matching the physical design element.

20 Claims, 14 Drawing Sheets

(56) References Cited

U.S. PATENT DOCUMENTS

| | | | |
|---|---|---|---|
| 10,348,863 B2* | 7/2019 | Nishi | |
| 2014/0268225 A1* | 9/2014 | Shibukawa | ........ H04N 1/00204 |
| | | | 358/1.15 |
| 2016/0150104 A1* | 5/2016 | Wagatsuma | ....... H04N 1/00244 |
| | | | 358/1.15 |
| 2018/0276865 A1 | 9/2018 | Pinch et al. | |
| 2019/0146654 A1* | 5/2019 | Hu | ...................... G06F 3/04817 |

FOREIGN PATENT DOCUMENTS

| | | | |
|---|---|---|---|
| JP | 2016133971 A | * | 7/2016 |
| JP | 2016148909 A | * | 8/2016 |
| KR | 30-0882730 | | 11/2016 |

OTHER PUBLICATIONS

Takahashi Masao, JP-2016148909-A English Translation, 2016, Abstract (Year: 2016).*
Izuhara Takenori, JP-2016126574-A English Translation, 2016, Abstract (Year: 2016).*
Ishiguro Kazuhiro, JP-2014036286-A English Translation, 2016, Abstract (Year: 2014).*
Korean Application No. 2019-013133, Determination of Allowance dated Nov. 19, 2019, p. 1.

* cited by examiner

APP SYNCHRONIZED WITH LIGHTED PHYSICAL DESIGN ELEMENT ON DOCUMENT PROCESSING APPARATUS

CROSS-REFERENCE TO RELATED APPLICATIONS

The present invention is related to co-pending design application entitled "TRIANGULAR SCREEN ICON INCREASING IN SIZE", U.S. patent application Ser. No. 29/674,473 filed on Dec. 21, 2018, the entire teachings of which are incorporated herein by reference.

BACKGROUND

Systems and methods herein generally relate document processing apparatuses and more particularly to apps synchronized with a lighted physical design element on document processing apparatus.

User friendliness is a hallmark of devices that have found success among customers. Historically, efforts to improve the user/machine interaction have been focused on the location, size, and tactile inputs of the screens, keyboards, and buttons on the device. For example, touchscreens can be used alone or can be used in combination with keyboards and/or hard buttons to accommodate a wide diversity of user input preferences.

Supplementing the machine's user interface with remote interfaces presented through websites and apps allows users of computers, smartphones, kiosks, etc., to bypass the user interface on the machine. The screens of such remote computerized devices present opportunities for flexibility of interface features that exceeds the displays that are physically connected to the device.

SUMMARY

Systems herein can include (among other components) a document processing apparatus, and a computer server adapted to supply an app to external computing devices through a computer network, etc. The document processing apparatus can include (among other components) a scanner, a printing engine, a network communication device, etc. The app is adapted to communicate with the document processing apparatus through the external computing device to perform document processing operations that operate the scanner, the printing engine, or the network communication device, without interacting with a user interface of the document processing apparatus.

The document processing apparatus also includes a physical design element that is on, or forms part of, the exterior surface of the document processing apparatus. The physical design element comprises lighting elements adapted to change color and the app causes the screen of the external computing device to display an icon matching the physical design element (the physical design element and the icon have the same color, shape, blink at the same rate, etc.).

Further, the app is adapted to simultaneously change the appearance of the icon and the physical design element during different steps of document processing operations to always keep the icon's appearance matching that of the physical design element (e.g., by keeping the icon and the physical design element the same color and/or by flashing or pulsing the icon and the physical design element in synchronization). Also, the different colors of the icon and the physical design element indicate different status conditions (e.g., error conditions, warning conditions, active processing conditions, and processing complete conditions).

In operation, the icon can be a triangle in one corner of the screen and one edge of the icon moves across the screen of the external computing device to increase the amount of the screen the icon occupies, and to indicate the amount of progress the document processing apparatus has performed on a document processing operation.

Methods herein provide a computer server adapted to supply an app to an external computing device through a computer network, etc. Once the app is installed and open/operating on the external computing device, these methods establish communications between the document processing apparatus and the app operating on the external computing device. The communications are established through components of the external computing device.

Again, the document processing apparatus has a physical design element on an exterior surface of the document processing apparatus. The physical design element has lighting elements adapted to change color. In methods herein, the app causes a screen of the external computing device to display an icon matching the color and shape of the physical design element.

Further, in these methods, the app causes the screen to simultaneously change the appearance of the icon and the physical design element during different steps of document processing operations to always keep the icon matching the physical design element (e.g., by keeping the icon and the physical design element the same color and/or by flashing or pulsing the icon and the physical design element in synchronization). Also, the different colors of the icon and the physical design element indicate different status conditions (e.g., error conditions, warning conditions, active processing conditions, and processing complete conditions). Again, the different colors of the icon and the physical design element indicate different status conditions.

Additionally, with these methods, the app causes the screen to move the edge of the icon across the screen of the external computing device to increase the amount of the screen the icon occupies to indicate the amount of progress the document processing apparatus has performed on a document processing operation.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1A:
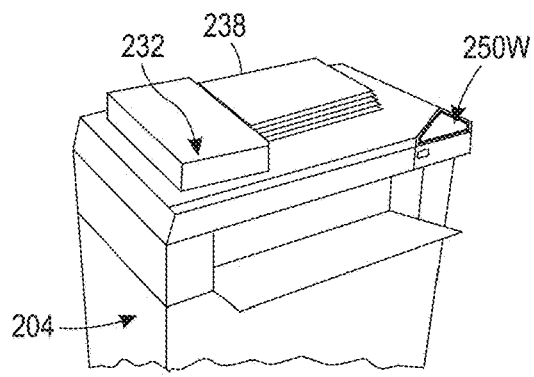
FIGS. 1A-4C are perspective schematic diagrams illustrating devices herein.

As mentioned above, supplementing the machine's user interface with remote interfaces presented through websites and apps allows users of computers, smartphones, kiosks, etc., to bypass the user interface on the machine. While the user can provide all inputs through remote devices and skip interaction with the device's user interface, this can sometimes cause user confusion because the machine does not provide visual feedback regarding progress toward completion of processing operations; except possibly through indicators on the screen display, of which the user may be unaware or may be avoiding.

Therefore, until printed sheets start appearing on the output tray, users who are not attuned to, or want to skip interaction with, the user interface of a conventional document processing apparatus may not be provided feedback that progress is being made on a job they submitted remotely. Also, in locations with a high-density of document processing devices, a user may not know which device is processing their remotely submitted job because of this lack of feedback. This conventional lack of feedback relating to remotely submitted document processing jobs can result in document processing jobs being lost or abandoned, and/or to duplicate submission of the same job.

In view of such issues, the systems and methods herein provide apps synchronized with lighted physical design element on the exterior of document processing apparatus. Devices herein provide a signature brand emotive experience for users who submit document processing jobs through personal computers, mobile devices, smart phones, and tablets to provide a richer form of feedback.

Systems and devices herein supply feedback of different machine states utilizing different background colors on a lighted physical design element of the document processing device. For example, for printing or copying, the lighted physical design element may display a green color, while if there is a machine fault or jam, the color of the lighted physical design element might change to amber or red. Thus, by leveraging the power and technology of mobile devices and apps, systems and devices herein use the lighted physical design element to enhance the emotional feedback provided to the user beyond what the conventional systems offer.

In greater detail, as shown in FIGS. 1A-1G, systems herein can include (among other components) a document processing apparatus 204, a computer server 200 adapted to supply an app 300 to an external computing device 260 (a device separate from the document processing apparatus 204, such as smart phones, portable computers, stationary computers, tablets, kiosks, etc.) through a computer network 202, etc. (also see FIGS. 6-8, discussed in detail below). As is understood by those ordinarily skilled in the art, applications, or "apps" for shorthand, are sets of instructions (such as software programs, etc.) that are automatically executable by a computer to cause devices to perform automated operations, such as document processing operations.

The document processing apparatus can include (among other components) a scanner 232, a printing engine 240, a network communication device 214, etc. The app 300 is adapted to communicate (wirelessly) with the document processing apparatus 204 through components of the external computing device 260 to perform document processing operations that automatically operate the scanner 232, the printing engine 240, or the network communication device 214, without necessarily interacting with the user interface 212 of the document processing apparatus 204 (again, see FIGS. 6-8, discussed in detail below).

The document processing apparatus 204 also includes a physical design element that is part of, or is on, the exterior surface of the document processing apparatus 204. The physical design element is identified in the drawings using identifiers 250G, 250P, 250R, 250W (e.g., 250 (G,P,R,W, etc.)) to represent some of the different colors (e.g., green, pink, red, white, etc.) the physical design element 250 (G,P,R,W, etc.) may have. While some colors are used in examples herein, the physical design element 250 (G,P,R,W, etc.) can be any color.

To be more specific about some of the terms used herein, the "bottom" of the document processing apparatus 204 is adjacent the surface upon which the document processing apparatus rests (e.g., the floor, the ground, a platform, etc.) and the "top" of the document processing apparatus 204 is opposite the bottom. The physical design element 250 (G,P,R,W, etc.) is on/at the top of the document processing apparatus 204 so that it is easily viewable. For example, the physical design element 250 (G,P,R,W, etc.) may be visible to the user when the user interface of the document processing apparatus 204 is not, or when the document processing apparatus 204 does not have a user interface, which allows the systems and devices herein to provide a form a feedback that conventional devices could not.

The physical design element 250 (G,P,R,W, etc.) comprises lighting elements adapted to change color and the app 300 causes the screen 262 of the external computing device 260 to display a synchronized color icon 310 (G,P,R,W, etc.) matching the shape and color of the physical design element 250 (G,P,R,W, etc.). Thus, the physical design element 250 (G,P,R,W, etc.) and the icon 310 (G,P,R,W, etc.) have the same color and shape; and therefore, the icon 310 (G,P,R,W, etc.) is identified in the drawings using identifiers 310G, 310P, 310R, 310W (e.g., 310 (G,P,R,W, etc.)) to represent some of the different colors (e.g., green, pink, red, white, etc.).

Further, the app 300 is adapted to simultaneously change the appearance of the icon 310 (G,P,R,W, etc.) and the physical design element 250 (G,P,R,W, etc.) during different steps of document processing operations to always keep the icon's 310 (G,P,R,W, etc.) appearance matching that of the physical design element 250 (G,P,R,W, etc.) (e.g., by keeping the icon 310 (G,P,R,W, etc.) and the physical design element 250 (G,P,R,W, etc.) the same color and/or by flashing or pulsing the icon 310 (G,P,R,W, etc.) and the physical design element 250 (G,P,R,W, etc.) in synchronization). Also, the different colors of the icon 310 (G,P,R,W, etc.) and the physical design element 250 (G,P,R,W, etc.) indicate different status conditions (e.g., error conditions, warning conditions, active processing conditions, and processing complete conditions).

Figure 1B:
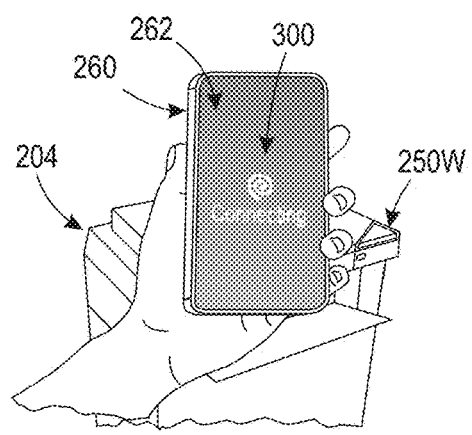

More specifically, FIGS. 1A-1G illustrate an example of using the systems and devices herein to perform a scan-and-send operation, which involves scanning an item or document and automatically sending a file containing the scanned image to an identified recipient. Thus, FIG. 1A illustrates some sheets 238 inserted into the document hander (sheet feeder) of the scanner structure 232. After a user open's the app 300 on their portable device 260, FIG. 1B shows a user establishing a communication session connection between the app 300 appearing on the screen 262 of the portable/remote device 260. In item 1A-1B, the physical design element 250W is color that matches the exterior of the document processing apparatus 204 (e.g., generically identified as white, which represents all colors that match the corresponding exterior herein, or represents lights within the physical design element 250W being off) because the corresponding icon does not yet appear on the screen 262.

Figure 1C:
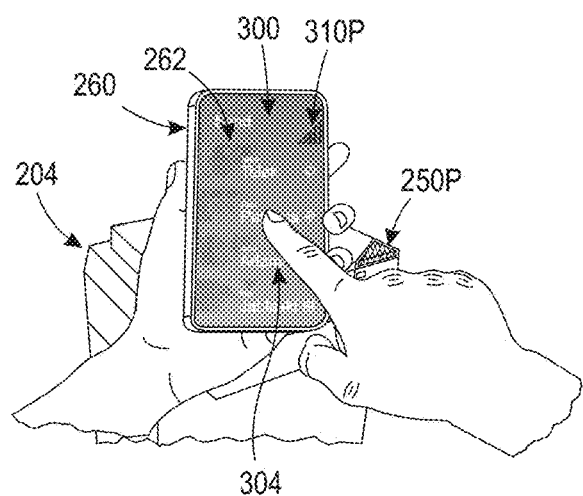

As shown in FIG. 1C, a screen display 262 is presented after the user has selected a menu option to choose the recipient of the scan from a contact list 304, where the app 300 can include an icon 310P and the app 300 can synchronize the color of the physical design element 250P (both are pink in this example). Once the user has selected the scan recipient from the contact list 304, as shown in FIG. 1D, the user is presented with a start icon (icon 310G) that is green and the physical design element 250G is similarly synchronized by the app 300 to also be green (and the lighting in both can blink/pulse in synchronization to provide more feedback).

Figure 1D:
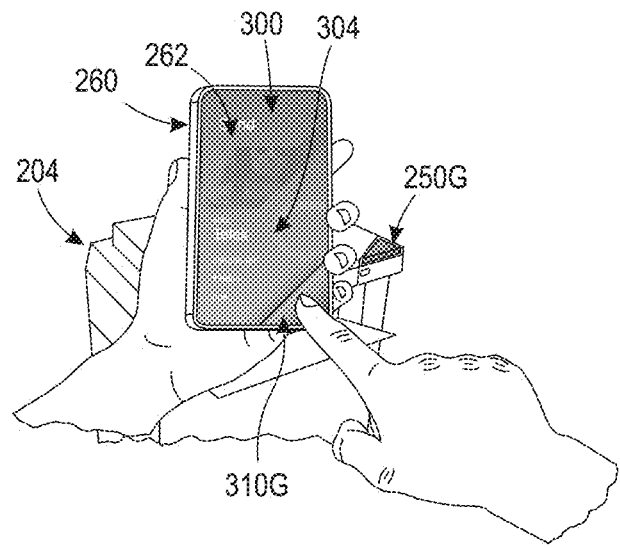
Figure 1E:
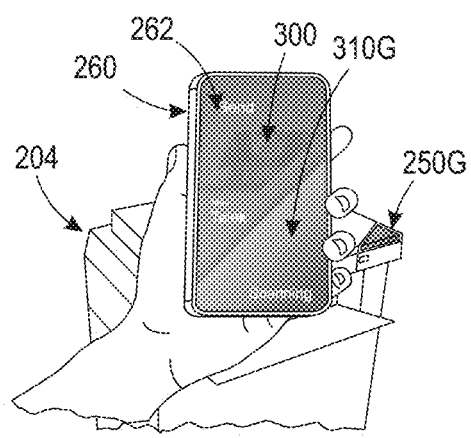
Figure 1F:
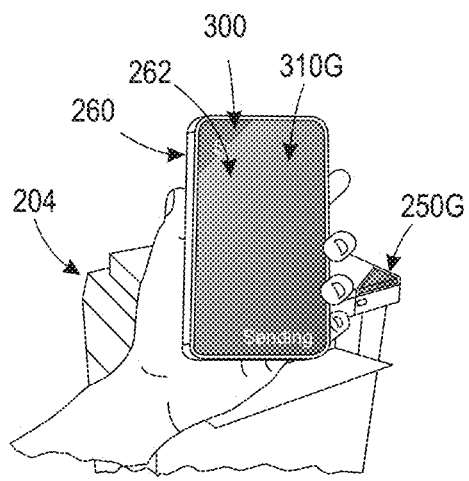
Figure 5:
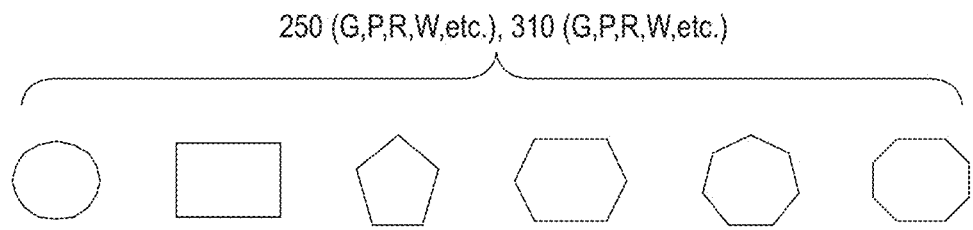
FIG. 5 is a schematic diagram illustrating some shapes of physical design elements and icons herein.

Selection of the icon 310G in FIG. 1D causes the scan operation to commence. As shown in FIGS. 1E-1F, in order to provide feedback that processing is occurring (when there may be no other visible indicators that processing is occurring) during scanning and data processing of the scanned images, the edge of the icon 310G moves across the screen 262 of the external computing device 260 to increase the amount of the screen 262 the icon 310G occupies. In the example shown the icons 310 (G,P,R,W, etc.) herein are right triangles that have the right angle located in the corner of the screen 262; however, those ordinarily skilled in the art would understand that the physical design elements 250G (G,P,R,W, etc.) and icons 310 (G,P,R,W, etc.) could be any shapes (e.g., rectangular, circular, multi-sided, etc.), as shown, for example, in FIG. 5. Note that while FIG. 5 illustrates some exemplary shapes for the physical design elements 250G (G,P,R,W, etc.) and icons 310 (G,P,R,W, etc.), the physical design elements 250G (G,P,R,W, etc.) and icons 310 (G,P,R,W, etc.) are not limited to such shapes, proportions, etc., but can be any shape including straight lines, curved lines, combinations of such items, etc. Using the triangle example, the edge that moves across the screen is the hypotenuse.

Again, here the lighting in both the physical design element 250G and icon 310G can blink/pulse in synchronization to provide the user more feedback that is different from feedback that would be provided through a user interface screen. Therefore, the synchronized appearance of the physical design element 250G and icon 310G indicate the amount of progress the document processing apparatus 204 has performed on a remotely submitted document processing operation.

Figure 1G:
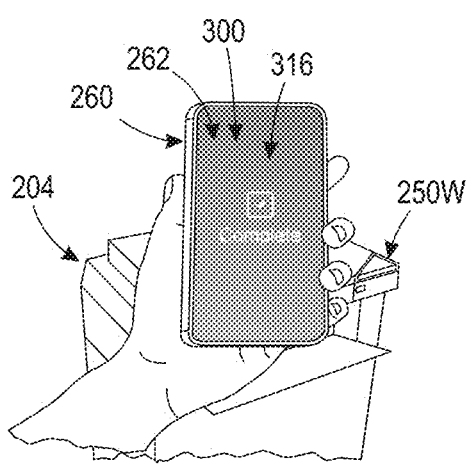

As shown in FIG. 1G, when the scanning operation has been completed and the file has been sent to the identified recipient, the app 300 presents a complete display 316 on the screen 262 of the external computing device 260. Because no icon is within the complete display 316, the physical design element 250W matches the color of the exterior of the document processing apparatus 204 (and is shown as "white" in the drawings).

Figure 2A:
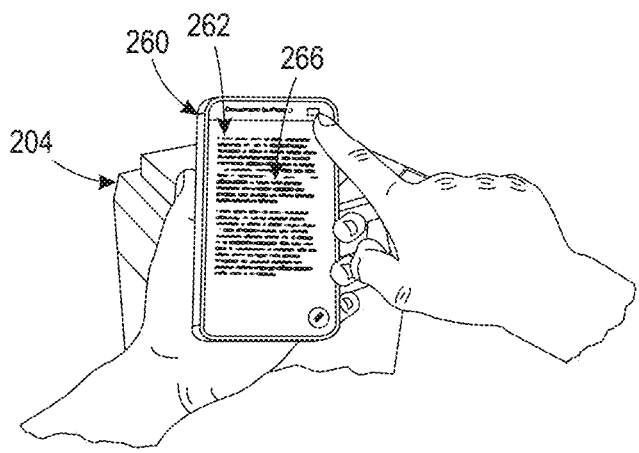
Figure 2B:
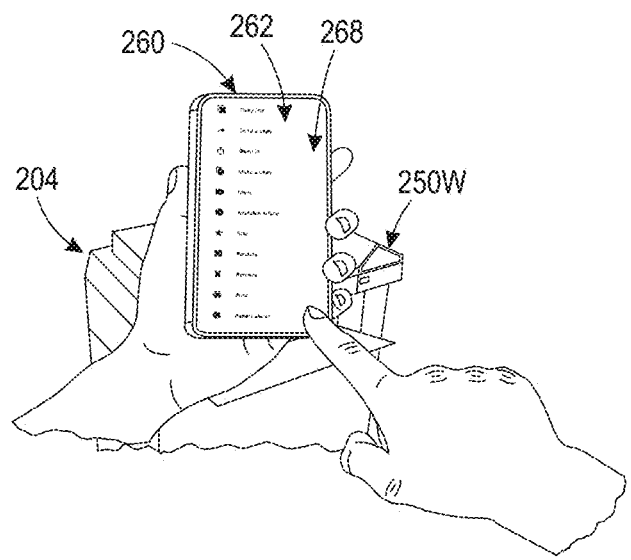
Figure 2C:
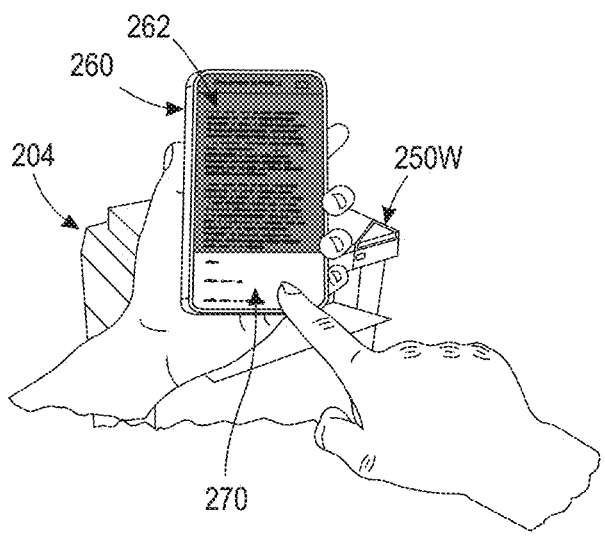

In another example, shown in FIGS. 2A-2H, a user performs a print operation. Specifically, FIG. 2A illustrates a document 266 that the user has selected to be on the screen 262 of the external computing device 260. In FIG. 2B, the user selects a print option from a menu 268, and in FIG. 2C the user selects the document processing apparatus 204 to perform the print job. Note that in FIGS. 2B-2C, the physical design element 250W again is the color that matches the exterior of the document processing apparatus 204 (e.g., generically referred to herein as "white") because the corresponding icon does not yet appear on the screen 262.

Figure 2D:
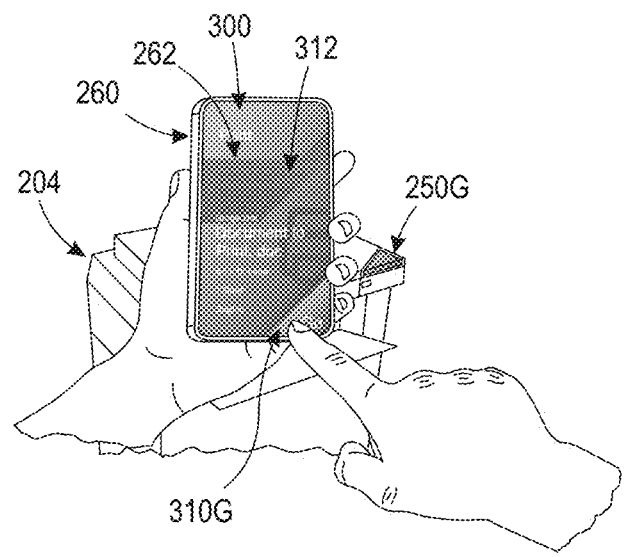

In FIG. 2D, the app 300 causes the screen 262 to present a print display 312. FIG. 2D also illustrates that the app 300 shows an icon 310G that matches the physical design element 250G. Again, both the icon 310G and physical design element 250G have the same color (green) are the same shape (triangle in this example) and can blink or pulse in synchronization to provide feedback to the user that the app 300 and document processing apparatus 204 are in communication and that the document processing operation is begin performed and is progressing.

Figure 2E:
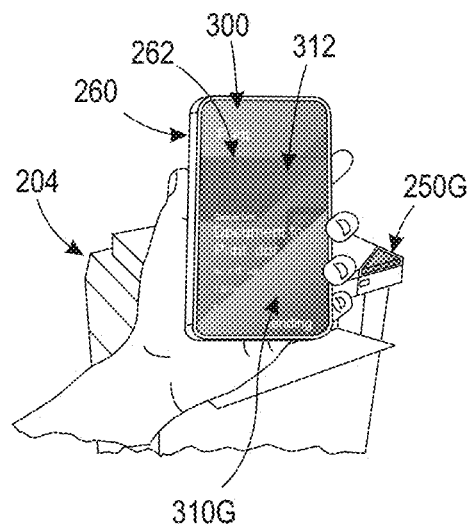
Figure 2F:
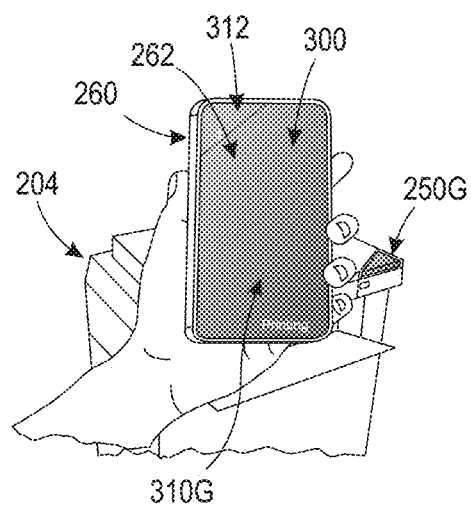

As shown in FIGS. 2E-2F, in order to provide feedback that processing is occurring (when there may be no other visible indicators that processing is occurring) during printing and data processing of the print data, again the edge of the icon 310G moves across the screen 262 of the external computing device 260 to increase the amount of the screen 262 the icon 310G occupies. Again, here the lighting in both the physical design element 250G and icon 310G can blink/pulse in synchronization to provide more feedback. Therefore, the synchronized appearance of the physical design element 250G and icon 310G indicate the amount of progress the document processing apparatus 204 has performed on the printing operation shown in print display screen 312.

Figure 2G:
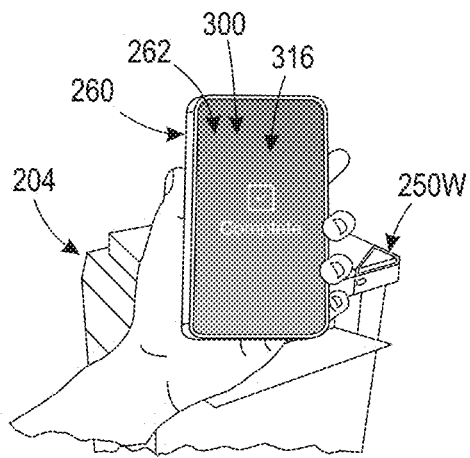
Figure 2H:
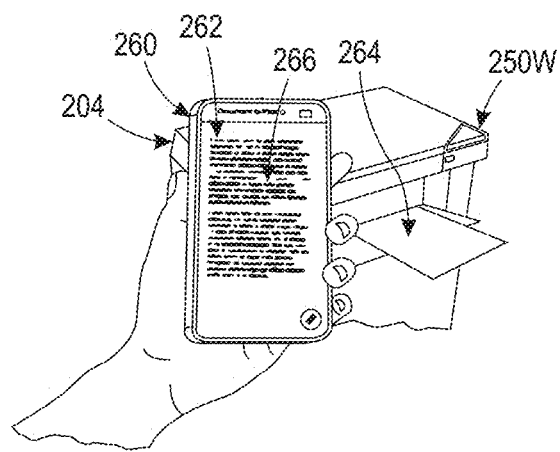

As shown in FIG. 2G, when the printing operation has been completed, the app 300 presents a complete display 316 on the screen 262 of the external computing device 260. FIG. 2H shows the printed document 264 output from the document processing apparatus 204. Because no icon is within the complete display 316 or when the document 266 is displayed, the physical design element 250W matches the color of the exterior of the document processing apparatus 204 (and is shown as "white" in the FIGS. 2G-2H).

Figure 3A:
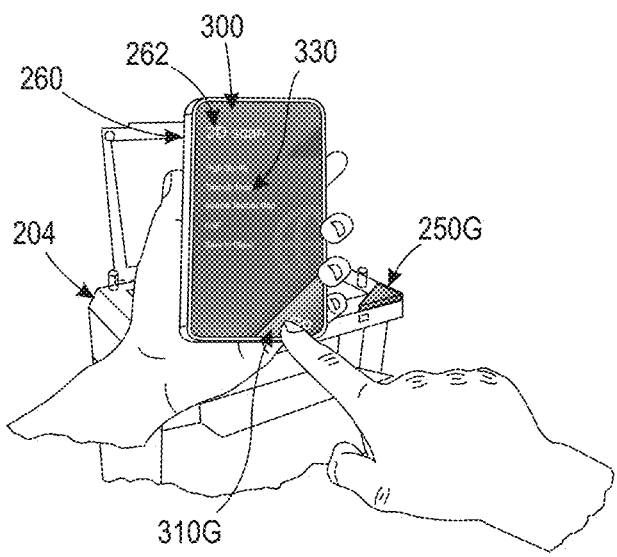
Figure 3B:
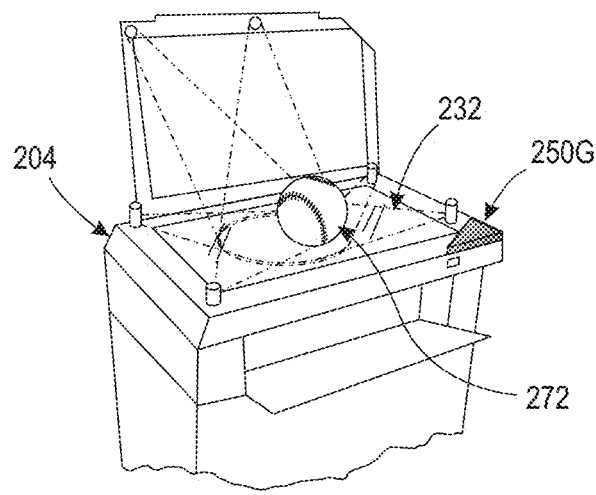

FIG. 3A shows a screen display 330 presented after the user has selected a menu option to choose 3D-to-2D-to-3D processing operations, where the app 300 can include an icon 310G and the app 300 can synchronize the color of the icon 310G and the physical design element 250G (both are green in this example). Once the user has selected the scan icon 310G, as shown in FIG. 3B, an item 272 (e.g., ball or other 3D item) can be 3D scanned in the scanner 232 (and the lighting in physical design element 250G provides more feedback that the scan is underway).

Figure 3C:
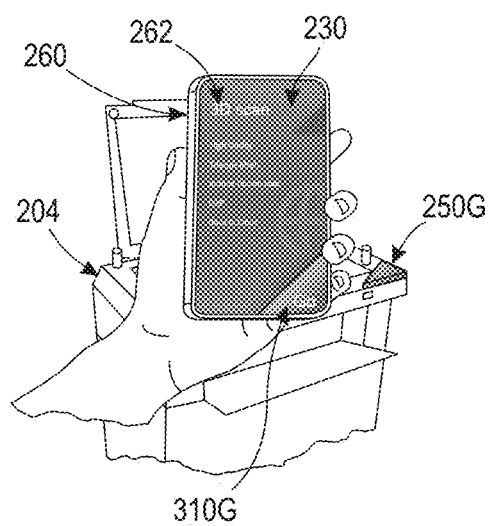

In a similar manner to that discussed above, as shown in FIG. 3C, during scanning and data processing of the scanned images, the edge of the icon 310G moves across the screen 262 of the external computing device 260 to increase the amount of the screen 262 the icon 310G occupies. Again, here the lighting in both the physical design element 250G and icon 310G can blink/pulse in synchronization to provide more feedback. Therefore, the synchronized appearance of the physical design element 250G and icon 310G indicate the amount of progress the document processing apparatus 204 has performed on the 3D-to-2D-to-3D processing operation.

Figure 3D:
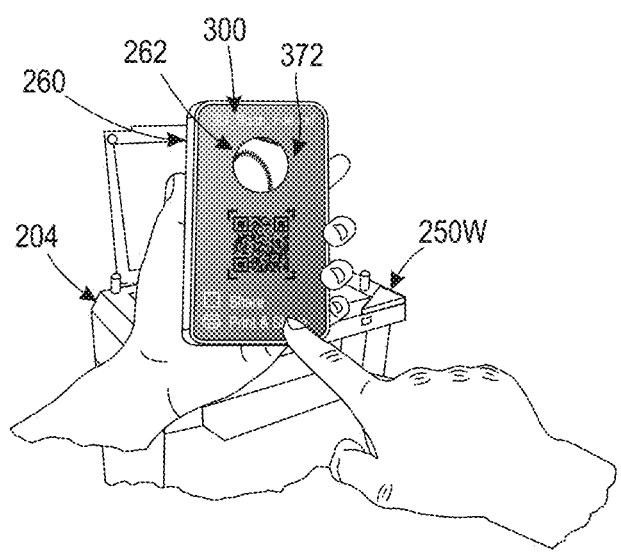

As shown in FIG. 3D, when the 3D-to-2D-to-3D processing operation has been completed, the app 300 presents a 3D-to-2D-to-3D display 372 on the screen 262 of the external computing device 260. The 3D-to-2D-to-3D display 372 includes elements such as a glyph or quick-reference (QR) code that allows users to reference network storage locations to retrieve files that can be printed or imported into other applications in either 2D format or 3D format. Because no icon is within the 3D-to-2D-to-3D display 372, the physical design element 250W matches the color of the exterior of the document processing apparatus 204 (and is shown as "white" in the drawings).

Figure 4A:
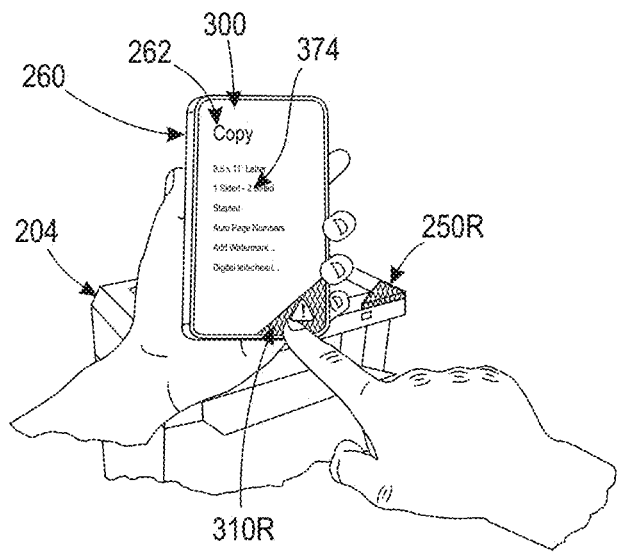
Figure 4B:
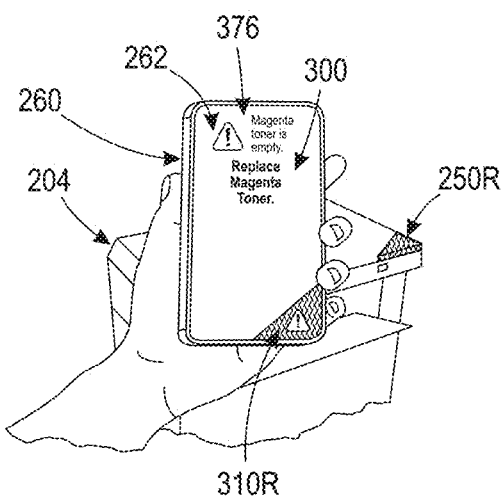
Figure 4C:
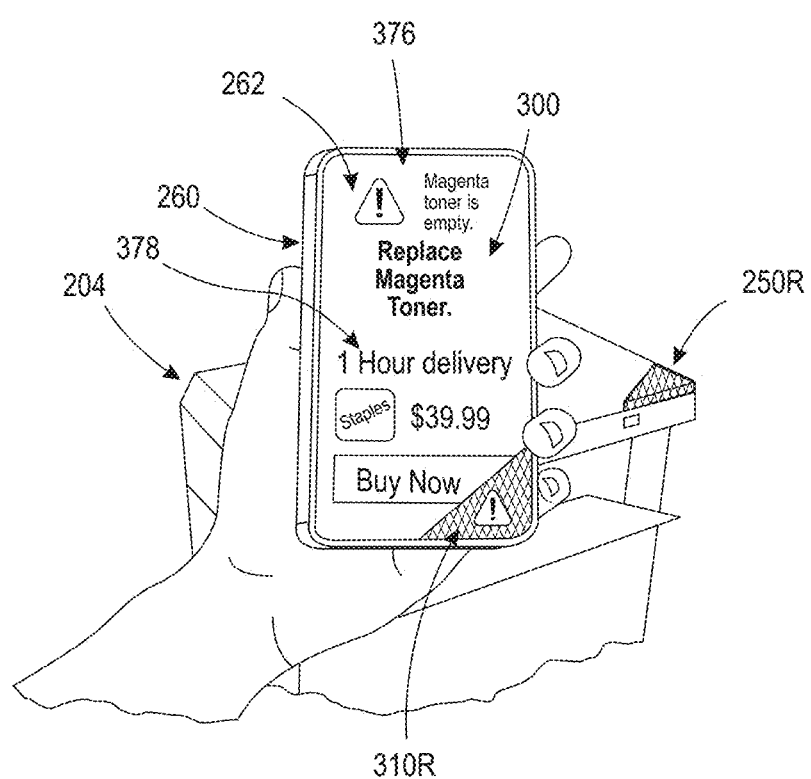

While the previous discussion shows how just a few of many different processing operations steps can provide a greater amount of user feedback, FIGS. 4A-4C provide an example of how additional user feedback can be supplied for many different machine status conditions. Specifically, FIG. 4A shows how an error condition can be presented in a copy display 374 of the app 300. The error condition in this example is a toner cartridge needing replacement where, rather than a green icon, instead a red icon 310R is presented on the display 262 by the app 300. Correspondingly, the physical design element 250R is also red, and can blink/pulse in coordination with the red icon 310R.

FIG. 4B illustrates an error detail screen 376 that can specify details about the machine status (where a magenta cartridge needs replacement); and FIG. 4C can include additional details 378, such as where/how such a replacement may be obtained. Note that as with the previous examples, as long as the red icon 310R is displayed, the physical design element 250R is also red, and can blink/pulse in coordination with the red icon 310R.

Figure 6:
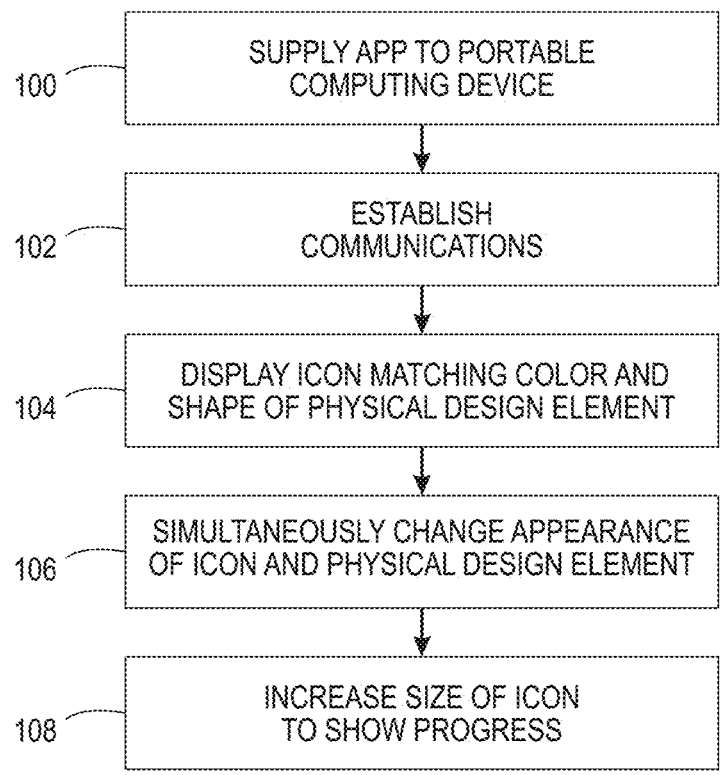
FIG. 6 is a flow diagram of various methods herein.

FIG. 6 is flowchart illustrating exemplary methods herein. In item 100, these methods provide a computer server adapted to supply an app to an external computing device through a computer network, etc. Once the app is installed and open/operating on the external computing device, in item 102 these methods establish communications between the document processing apparatus and the app operating on the external computing device. The communications are established in item 102 through the external computing device.

Again, the document processing apparatus has a physical design element on an exterior surface of the document processing apparatus. The physical design element has lighting elements adapted to change color. In item 104, the app causes a screen of the external computing device to display an icon matching the color and shape of the physical design element.

Further, in item 106 the app causes the screen to simultaneously change the appearance of the icon and the physical design element during different steps of document processing operations to always keep the icon matching the physical design element (e.g., by keeping the icon and the physical design element the same color and/or by flashing or pulsing the icon and the physical design element in synchronization). Also, the different colors of the icon and the physical design element indicate different status conditions (e.g., error conditions, warning conditions, active processing conditions, and processing complete conditions). Again, the different colors of the icon and the physical design element indicate different status conditions.

Additionally, with these methods, in item 108, the app causes the screen to move the edge of the icon across the screen of the external computing device to increase the size of the icon and the amount of the screen the icon occupies to indicate the amount of progress the document processing apparatus has performed on a document processing operation.

Figure 7:
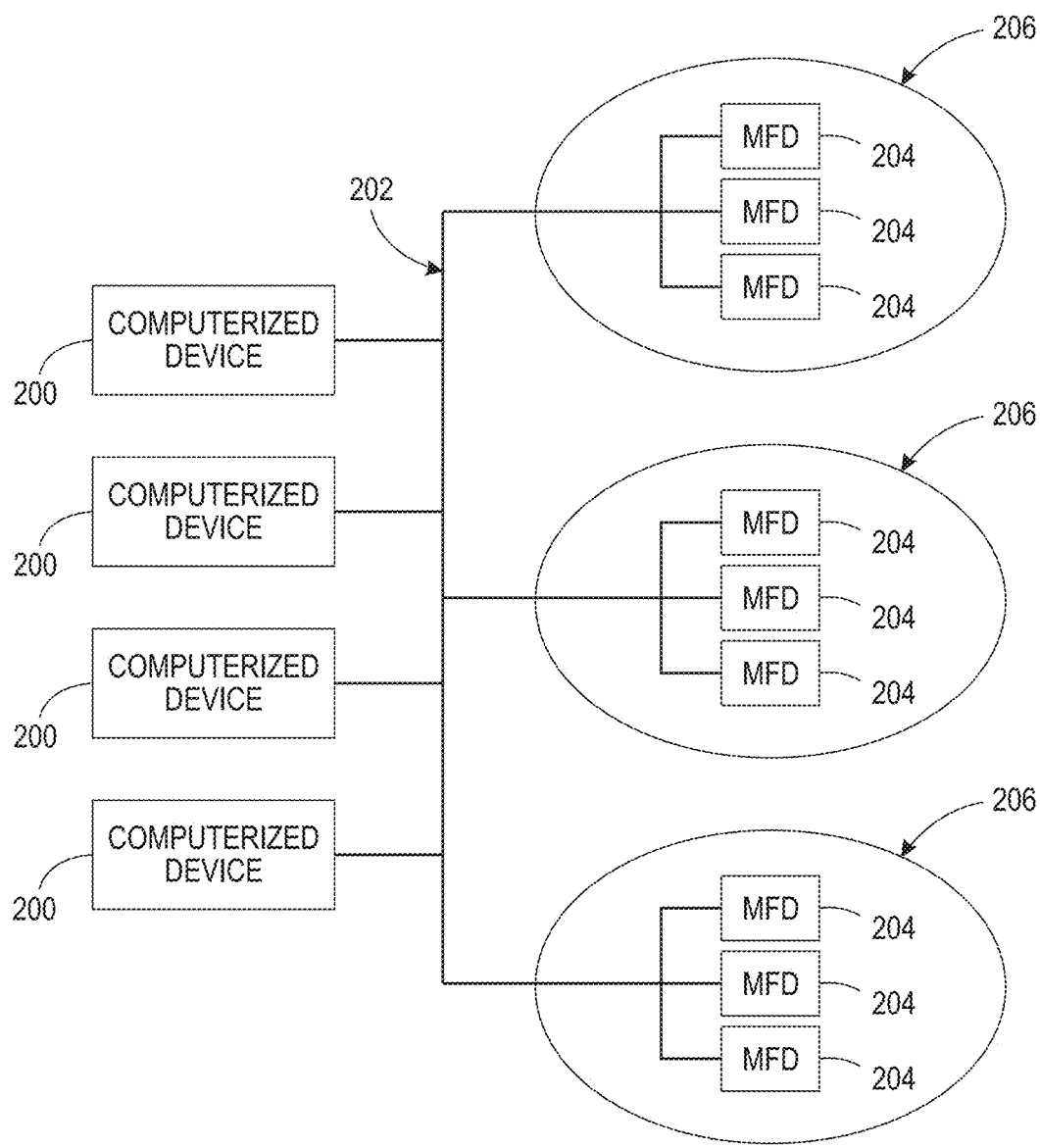
FIG. 7 is a schematic diagram illustrating systems herein.

As shown in FIG. 7, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 8:
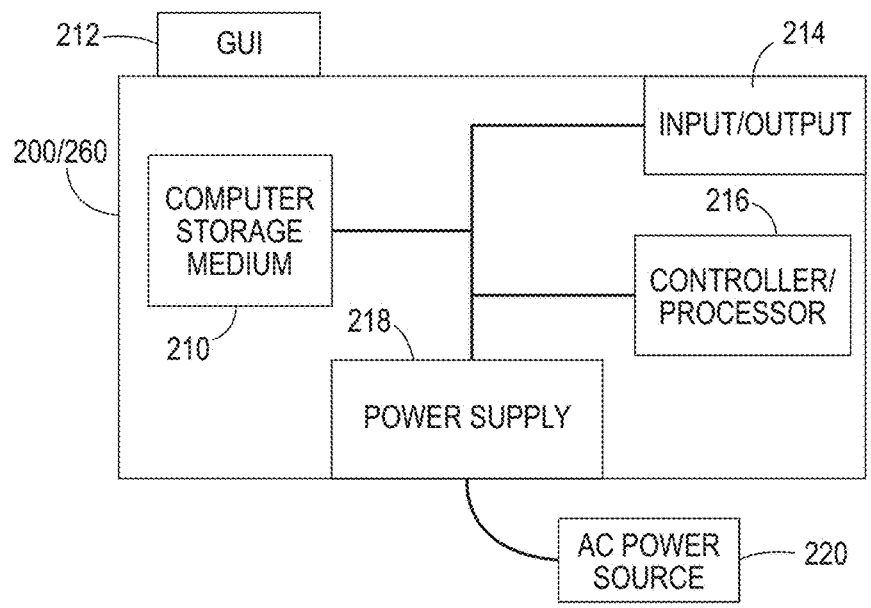
FIG. 8 is a schematic diagram illustrating devices herein.

FIG. 8 illustrates a computerized device 200, which can be used with systems and methods herein and can comprise, for example, a server, a personal computer, the external computing device 260, etc. The server 200/external computing device 260 includes a controller/tangible processor 216 and a communications port (input/output) 214 operatively connected to the tangible processor 216 and to the computerized network 202 external to the server 200/external computing device 260. Also, the server 200/external computing device 260 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the server 200/external computing device 260 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 8, a body housing has one or more functional components that operate on power supplied from an alternating current (AC) source 220 by the power supply 218. The power supply 218 can comprise a common power conversion unit, power storage element (e.g., a battery, etc.), etc.

Figure 9:
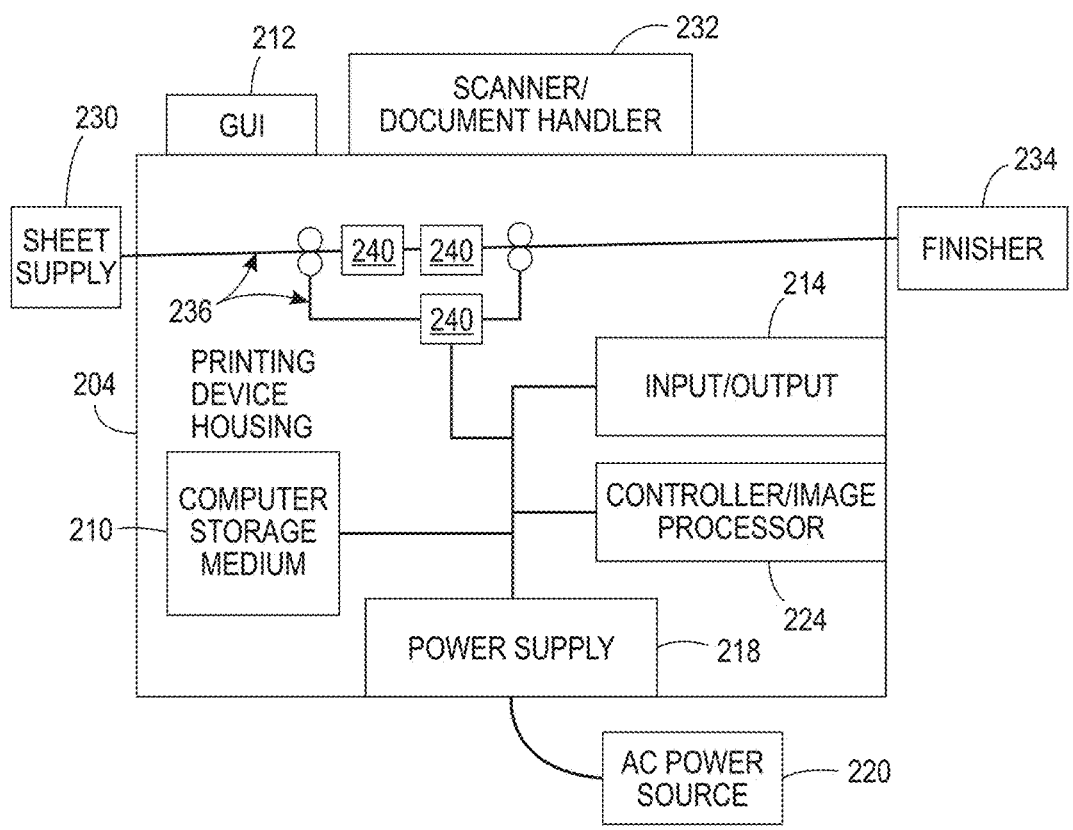
FIG. 9 is a schematic diagram illustrating devices herein.

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Thus, as noted above, the app causes the screen of the external computing device to display an icon matching the physical design element (the physical design element and the icon have the same color, shape, blink at the same rate, etc.).

Thus, as explained above, the app 300, when executed by the processor 216/224, is adapted to simultaneously change the appearance of the icon 310 (G,P,R,W, etc.) and the physical design element 250 (G,P,R,W, etc.) during different steps of document processing operations to always keep the icon's 310 (G,P,R,W, etc.) appearance matching that of the physical design element 250 (G,P,R,W, etc.). Also, the different colors of the icon 310 (G,P,R,W, etc.) and the physical design element 250 (G,P,R,W, etc.) indicate different status conditions (e.g., error conditions, warning conditions, active processing conditions, and processing complete conditions) of the various document processing operations that the app 300 is causing (when being executed by the processor 216/224) the document processing device 204 and the server 200/external computing device 260 to automatically perform. Again, the icon 310 (G,P,R,W, etc.) can be a triangle, etc., in one corner of the screen and one edge of the icon moves across the screen of the external computing device 260 to increase the amount of the screen the icon occupies, and to indicate the amount of progress the document processing apparatus has performed on a document processing operation.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
    a document processing apparatus comprising a physical design element on an exterior surface of the document processing apparatus, wherein the physical design element comprises lighting elements adapted to change; and
    an app adapted to be supplied to an external computing device, wherein the app causes a screen of the external computing device to display an icon matching the physical design element,
    wherein the app is adapted to communicate with the document processing apparatus through the external computing device,
    wherein the app is adapted to simultaneously change an appearance of the icon and the physical design element during different steps of document processing operations to keep the icon matching the physical design element, and
    wherein the icon changes to increase an amount of the screen the icon occupies to indicate an amount of progress the document processing apparatus has performed on a document processing operation.

2. The system according to claim 1, wherein the app keeps the icon matching the physical design element by keeping the icon and the physical design element the same color.

3. The system according to claim 1, wherein the app keeps the icon matching the physical design element by flashing or pulsing the icon and the physical design element in synchronization.

4. The system according to claim 1, wherein different colors of the icon and the physical design element indicate different status conditions.

5. The system according to claim 1, wherein when the icon changes to increase an amount of the screen the icon occupies an edge of the icon moves across the screen of the external computing device to increase the amount of the screen the icon occupies.

6. The system according to claim 1, wherein the physical design element and the icon have the same shape.

7. The system according to claim 1, wherein the document processing apparatus has a bottom adjacent a surface upon which the document processing apparatus rests and a top opposite the bottom, wherein the physical design element is on the top of the document processing apparatus.

8. A system comprising:
    a document processing apparatus comprising:
        a physical design element on an exterior surface of the document processing apparatus, wherein the physical design element comprises lighting elements adapted to change;
a scanner;
a printing engine; and
a network communication device; and
a computer server adapted to supply an app to an external computing device through a computer network, wherein the app causes a screen of the external computing device to display an icon matching the physical design element,
wherein the app is adapted to communicate with the document processing apparatus through the external computing device to perform document processing operations that operate the scanner, the printing engine, or the network communication device, without interacting with a user interface of the document processing apparatus, and
wherein the app is adapted to simultaneously change an appearance of the icon and the physical design element during different steps of the document processing operations to keep the icon matching the physical design element, and
wherein the app is adapted to change the icon to increase an amount of the screen the icon occupies to indicate an amount of progress the document processing apparatus has performed on a document processing operation.

9. The system according to claim 8, wherein the app keeps the icon matching the physical design element by keeping the icon and the physical design element the same color.

10. The system according to claim 8, wherein the app keeps the icon matching the physical design element by flashing or pulsing the icon and the physical design element in synchronization.

11. The system according to claim 8, wherein different colors of the icon and the physical design element indicate different status conditions.

12. The system according to claim 8, wherein when the icon changes to increase an amount of the screen the icon occupies an edge of the icon moves across the screen of the external computing device to increase the amount of the screen the icon occupies.

13. The system according to claim 8, wherein the physical design element and the icon have the same shape.

14. The system according to claim 8, wherein the document processing apparatus has a bottom adjacent a surface upon which the document processing apparatus rests and a top opposite the bottom, wherein the physical design element is on the top of the document processing apparatus.

15. A method comprising:
establishing communications between a document processing apparatus and an app operating on an external computing device, wherein the communications are established through the external computing device, and wherein the document processing apparatus comprising a physical design element on an exterior surface of the document processing apparatus, wherein the physical design element comprises lighting elements adapted to change;
causing, by the app, a screen of the external computing device to display an icon matching the physical design element;
simultaneously changing, by the app, an appearance of the icon and the physical design element during different steps of document processing operations to keep the icon matching the physical design element; and
changing, by the app, the icon to increase an amount of the screen the icon occupies to indicate an amount of progress the document processing apparatus has performed on a document processing operation.

16. The method according to claim 15, wherein the app keeps the icon matching the physical design element by keeping the icon and the physical design element the same color.

17. The method according to claim 15, wherein the app keeps the icon matching the physical design element by flashing or pulsing the icon and the physical design element in synchronization.

18. The method according to claim 15, wherein different colors of the icon and the physical design element indicate different status conditions.

19. The method according to claim 15, wherein the changing the icon to increase an amount of the screen the icon occupies comprises moving, by the app, an edge of the icon across the screen of the external computing device to increase the amount of the screen the icon occupies.

20. The method according to claim 15, wherein the physical design element and the icon have the same shape.

* * * * *